Sept. 27, 1949.          G. W. CRABTREE                2,483,185
              FRICTIONAL SPRING CONTROL MEANS
              AND THEIR MOUNTING ON VEHICLES
                    Filed Sept. 18, 1945
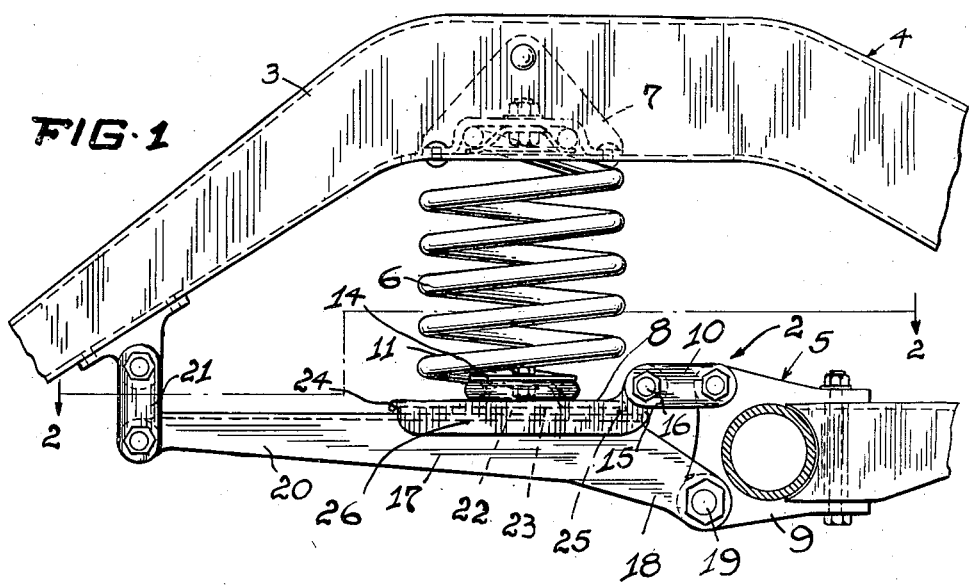
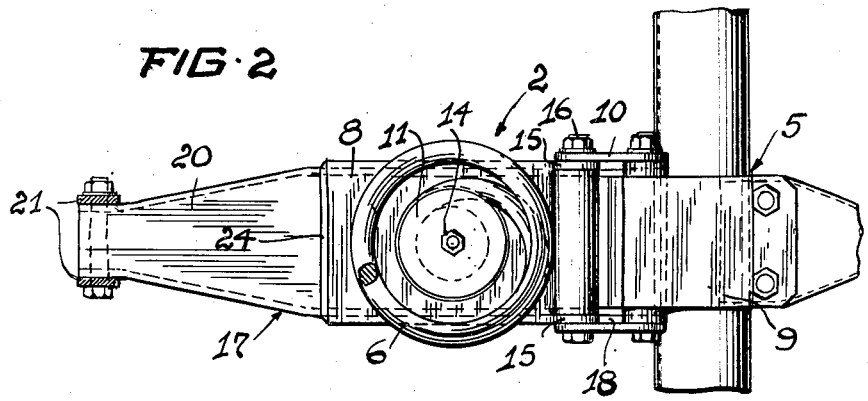
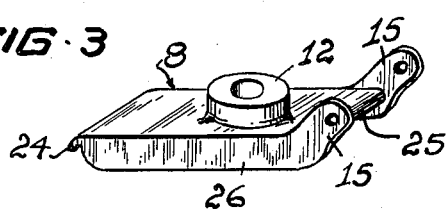
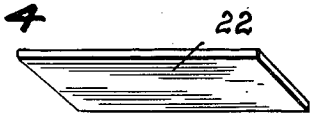
INVENTOR.
BY GEORGE W. CRABTREE Patented Sept. 27, 1949

2,483,185

UNITED STATES PATENT OFFICE 2,483,185

FRICTIONAL SPRING CONTROL MEANS AND THEIR MOUNTING ON VEHICLES

George W. Crabtree, Cleveland Heights, Ohio

Application September 18, 1945, Serial No. 617,087

6 Claims. (Cl. 267—9)

This invention relates in general to means for controlling vehicle springs and, more particularly, to frictional spring controlling means. Present day controlling means of this type properly control vehicle springs only when the springs carry the predetermined loads for which the controlling means have been adjusted, and changes in these loads change the control of the springs by the controlling means and therewith the desired riding comfort in vehicles equipped with this type of spring controlling means.

The general object of the present invention is the provision of improved frictional spring controlling means and their mounting with respect to the springs to be controlled, so as to continuously subject the controlling means to the loads carried by the springs and effect proper spring control in partly, fully or excessively loaded condition of these springs. This general object of the invention is attained by supporting the springs of vehicles upon spring controlling members which are frictionally seated upon the customary spring supporting axle members, and coupling both controlling and supporting members with the axles and frames of the vehicles to effect frictional movements between said members when the axles and frames during compression and reflex actions of the springs move vertically toward and away from each other.

Another object of the invention therefore is the provision of improved frictional spring controlling members for vehicles, which members are seated between the springs and the customary spring supporting members, and coupling these controlling and supporting members with the axles and frames of the vehicles to effect substantially horizontal reciprocatory frictional movements between said members when the axles and frames of the vehicles reciprocate vertically with respect to each other during compression and reflex actions of the springs. In some cases the frictional controlling members for the springs can be seated only upon supporting members which are linked to the axles of the vehicles and to their frames, so that the controlling members must be reciprocated in order to effect frictional checking and retarding of the vertical movements of the springs.

A further object of the invention therefore is the provision of improved frictional controlling means for the springs of vehicles arranged between the springs and their supporting members and mounted for horizontal reciprocation with respect to the spring supporting means when frames and axles reciprocate vertically in compression and reflex actions of the springs.

Still another object of the invention is the provision of the above described frictional controlling means for the springs of vehicles with means effecting a greater degree of check in the movements of the springs in one direction than in the opposite direction.

In addition, the invention has other marked superiorities which clearly distinguish it from presently known structures. These improvements or superiorities, embodying certain novel features of construction, are clearly set forth in the following specification and the appended claims; and several preferred forms of embodiment of the invention are hereinafter shown with reference to the accompanying drawings forming part of the specification.

In the drawings:

Fig. 1 is a side-view of the rear chassis portion of a vehicle showing the spring supporting the rear frame portion of the vehicle and the improved frictional controlling member for the spring;

Fig. 2 is a sectional view on line 2—2 of Fig. 1;

Fig. 3 is a perspective view of the frictional controlling member; and

Fig. 4 is a perspective view of the friction member of the frictional controlling member.

Referring now in detail to the exemplified form of the invention shown in Figs. 1 through 4 of the drawings, reference numeral 2 denotes a rear chassis portion of an automobile having the rear portion of its side member 3 of frame 4 yieldingly supported on rear axle 5 by means of a coil spring 6. This coil spring is mounted at its upper end in a bracket 7 which is secured to side member 3, and rests with its lower end upon a friction shoe or frictional control member 8 coupled with the upper part of a bracket 9 on axle 5 by links 10. Friction shoe or control member 8 is rigidly attached to the lower end of spring 6 by means of a disk 11 which is secured to a boss 12 on said shoe by a bolt 14, and this shoe includes at its rear end upwardly extended arms 15 pivotally connected to the links at 16. This friction shoe seats upon a supporting member 17 of U-shaped cross section, which member includes downwardly extended front arms 18 hinged at 19 to the lower part of bracket 9 and a rear arm 20 linked to the side member 3 by a shackle 21. The supporting member 17 frictionally engages a friction member 22 of friction shoe 8, which friction member contacts the bottom face 23 of said shoe and is held against displacement by downwardly extended narrow flanges 24, 25 at the front and rear portions of said shoe and downwardly extended wider side flanges 26 which hug the sides of supporting member 17.

As the described pivotal connection of supporting member 17 with bracket 9 and the link connection of friction shoe 8 with said bracket are positioned in different horizontal planes, compression and reflex actions of spring 6 effect horizontal or substantially horizontal reciprocatory frictional movements between supporting member 17 and friction shoe 8 and such frictional reciprocatory movements check and retard compression and reflex actions of the spring and permit the desired control of the spring. The ratio of control of the spring is not effected by the load carried thereby, as the spring rests on the friction shoe so that the pressure exerted on the shoe is proportionate to the load carried by the spring.

Having thus described my invention what I claim is:

1. A vehicle chassis embodying frame means, axle means, a spring member extending between said frame means and axle means yieldingly holding said means in predetermined position with respect to each other and a frictional control member between said spring member and said axle means, said friction control member being linked to said axle means, said axle means including a shiftable supporting member pivoted thereto, and said supporting member extending below said frictional control member and supporting same and being linked to said frame member, said supporting member and said control member both being frictionally shifted with respect to each other by compression and reflex actions of said spring.

2. A vehicle chassis as described in claim 1, wherein said frictional control member includes in its central portion means extended into said spring member to prevent lateral movements of the spring with respect to said control member.

3. A vehicle chassis embodying frame means, axle means, a coil spring member extending between said frame means and axle means yieldingly holding said means in a predetermined position with respect to each other, and a frictional control member between said spring member and said axle means, said frictional control member being rigidly attached to one end of said coil spring member, and frictionally slidably supported by said axle means and linked to the said axle means, said axle means including a shiftable supporting member pivoted thereto, and said supporting member extending below said frictional control member and supporting same and being linked to said frame member, said supporting member and said control member both being frictionally shifted with respect to each other by compression and reflex actions of said spring.

4. A vehicle chassis embodying frame means, axle means, spring supporting lever means pivoted to said axle means and linked to said frame means, a spring member extending between the frame means and the lever means yieldingly spacing said frame means from said lever means, and a frictional control member rigidly secured to one end of said spring member and frictionally slidably resting on said lever means, said frictional control member being linked to said axle means at a point spaced from the pivotal connection of said lever means with said axle means to cause reciprocatory frictional movements between said control member and said lever means during compression and reflex actions of said spring.

5. A vehicle chassis as described in claim 4, wherein the pivot coupling of said spring supporting lever means with the axle means and the link connection of said frictional control member with the axle means are arranged in vertically spaced horizontal planes.

6. A vehicle chassis embodying frame means, axle means, U-shaped lever means pivoted to said axle means and linked to said frame means, a coil spring member extending between the frame means and the lever means yieldingly spacing said frame means from said lever means, and a U-shaped, frictional control member arranged between said spring and said lever means and frictionally slidably resting on said lever means, said frictional control member being linked to said axle means at a point spaced from the pivotal connection of said lever means with said axle means to cause reciprocatory movements of both, said control member and said lever means, and proper frictional control of the spring during compression and reflex actions.

GEORGE W. CRABTREE.

REFERENCES CITED

The following references are of record in the file of this patent:

UNITED STATES PATENTS

| Number | Name | Date |
|---|---|---|
| 578,425 | Senderling | Mar. 9, 1897 |
| 1,366,422 | Seymour | Jan. 25, 1921 |
| 1,552,984 | Dorey | Sept. 8, 1925 |
| 1,707,765 | O'Connor | Apr. 2, 1929 |